(12) United States Patent
Imanari et al.

(10) Patent No.: US 7,014,801 B2
(45) Date of Patent: Mar. 21, 2006

(54) POLYPROPYLENE RESIN HOLLOW MOLDED FOAM ARTICLE AND A PROCESS FOR THE PRODUCTION THEREOF

(75) Inventors: Daisuke Imanari, Kanuma (JP); Teruyuki Akiyama, Kanuma (JP); Naochika Kogure, Kanuma (JP); Masato Naito, Kanuma (JP)

(73) Assignee: JSP Corporation, Tokyo (JP)

( * ) Notice: Subject to any disclaimer, the term of this patent is extended or adjusted under 35 U.S.C. 154(b) by 129 days.

(21) Appl. No.: 10/667,362

(22) Filed: Sep. 23, 2003

(65) Prior Publication Data

US 2004/0062885 A1 Apr. 1, 2004

(30) Foreign Application Priority Data

Sep. 30, 2002 (JP) .............................. 2002-287761

(51) Int. Cl.
*B29C 44/20* (2006.01)
(52) U.S. Cl. ........................... 264/45.9; 264/50; 264/51
(58) Field of Classification Search ............... 264/45.9, 264/50, 51
See application file for complete search history.

(56) References Cited

U.S. PATENT DOCUMENTS 4,522,955 A 6/1985 Fukushima et al.

6,432,525 B1 8/2002 Gokuraku et al.

FOREIGN PATENT DOCUMENTS

| EP | 1 072 389 A1 | 1/2001 |
| EP | 1 075 933 | 2/2001 |
| JP | 60011330 | 1/1985 |
| JP | 2001-47537 | 2/2001 |
| JP | 2002-356573 | 12/2002 |

*Primary Examiner*—Allan R. Kuhns
(74) *Attorney, Agent, or Firm*—Sherman & Associates

(57) ABSTRACT

The present invention relates to a hollow molded foam article in which a plurality of polypropylene resins are used as the base resin, and to a process for the production of this hollow molded foam article. More particularly, the present invention relates to a polypropylene resin hollow molded foam article having a foam layer, in which the base resin comprises (a) a polypropylene resin with a melt tension of at least 98 mN and a melt flow rate of 0.5 to 15 g/10 minutes, (b) a polypropylene resin with a melt tension of less than 30 mN (excluding O) and a melt flow rate of 2 to 30 g/10 minutes, and (c) a polypropylene resin with a melt tension of at least 30 mN and less than 98 mN and a melt flow rate of 2 to 15 g/10 minutes, formed by positioning in a mold a softened cylindrical foam having a foam layer obtained by extruding from the die of an extruder a foamable molten resin composition containing a foaming agent, wherein the melt tension at 230° C. of the polypropylene resin that forms the foam layer is at least 10 mN and less than 49 mN, and the apparent density of the foam layer is no more than 0.3 g/cm³.

8 Claims, 5 Drawing Sheets

US 7,014,801 B2

POLYPROPYLENE RESIN HOLLOW MOLDED FOAM ARTICLE AND A PROCESS FOR THE PRODUCTION THEREOF

BACKGROUND OF THE INVENTION

1. Field of the Invention

The present invention relates to a hollow molded foam article in which a plurality of polypropylene resins are used as the base resin, and to a process for the production of a hollow molded polypropylene resin foam, and more particularly relates to the use of a plurality of polypropylene resins having specific melt tensions and melt flow rates.

2. Description of the Related Art

Blow molding technology has been utilized in the past to obtain blow-molded foams having a foam layer. Various methods have been proposed in the past for obtaining blow-molded foams, but the most common is a method in which a foaming agent and a base resin are melt-kneaded in an extruder, this mixture is extruded from a die, the cylindrical foam thus formed is placed in a metal mold, and blow molding is performed by blowing a pressurized gas into the interior of this cylindrical foam.

Blow-molded foams produced by this method can be used in applications that require thermal insulation, sound-proofing, flexibility, and other such properties, specific examples of which include containers, ducts, thermal insulation panels, and automotive parts. The expansion ratio used in these applications is 3 to 30 times. For instance, there is a known blow-molded foam in which polystyrene or polyethylene is used for the base resin and the expansion ratio of the foam layer is 4 to 12 times (see Japanese Patent Publication H3-59819, for example).

When the heat resistance of the molded article is taken into account, it is preferable to use a polypropylene resin as the base resin, and there have been numerous proposals for foams made from polypropylene resins because of the good heat resistance and rigidity of these resins. However, nearly all blow-molded foams made using a general purpose polypropylene resin as the base resin had a low expansion ratio in which the apparent density was over 0.3 g/cm$^2$ when foamed with a chemical foaming agent.

When a general purpose polypropylene resin is used as the base resin and is foamed with a physical foaming agent, foaming occurs when the foaming agent kneaded into the base resin expands, but with a polypropylene resin, changes in the temperature of the molten resin near the foaming temperature result in large changes in the melt tension and viscosity of the molten resin, and if the temperature of this resin is even just a little too high, the viscosity and melt tension will decrease to the point that the foaming agent cannot be held in the resin, the result being that the foaming agent escapes from the polypropylene resin during extrusion and foaming, the cells become continuous or rupture, and a good cylindrical foam cannot be obtained. In a worst case scenario, foaming itself is impossible. Conversely, if the melting temperature of the polypropylene resin is lowered in order to keep the viscosity and melt tension of the polypropylene resin high, the polypropylene resin undergoes crystallization, which prevents adequate and uniform foaming from being achieved.

There is only a narrow range of temperatures suited to the foaming of polypropylene resins, and it has been difficult to obtain a blow-molded foam with thick walls and a high expansion ratio using a general purpose polypropylene resin, but the present applicant has proposed a blow-molded foam with thick walls and a high expansion ratio, and a process for the production of this foam, that overcome this difficulty, in which a polypropylene resin having a specific melt tension and a specific melt flow rate is used as the base resin (for example, International Laid-Open Patent Application WO/99/28111).

Using a specific polypropylene resin having a specific melt tension and melt flow rate as above does produce a thick-walled foam with a good appearance, having a high expansion ratio, and having excellent heat resistance, thermal insulation properties, and so forth. Nevertheless, the above-mentioned specific polypropylene resins are expensive, which drives up the cost of the molded foam finished product thus obtained, so this is extremely disadvantageous from a cost standpoint except in special applications. Also, a large amount of flash is produced in the production of blow-molded foams, and the use of recycled material also poses problems.

Therefore, in light of the above situation, it is an object of the present invention to provide a thick-walled hollow molded foam with a good appearance and a high expansion ratio by using a plurality of polypropylene resins having specific melt tensions and melt flow rates, rather than using just one specific polypropylene resin having a specific melt tension and melt flow rate, as well as a process for the production of this foam.

SUMMARY OF THE INVENTION

As a result of various investigations aimed at achieving the stated object, the inventors discovered that conditions suitable for foaming can be easily achieved by using a base resin comprising a plurality of polypropylene resins having melt tensions and melt flow rates within a specific range, such as resins containing general purpose polypropylene resins or reused polypropylene resins, and that the production cost will be reduced, so that a thick-walled molded foam having a high expansion ratio and an attractive appearance can be obtained at a low cost.

Specifically, the present invention is:

(1) A polypropylene resin hollow molded foam article comprising a polypropylene resin foam layer, formed by placing a softened cylindrical foam in a mold, wherein the melt tension at 230° C. of the polypropylene resin that forms said foam layer is at least 10 mN and less than 49 mN, and the apparent density of said foam layer is no more than 0.3 g/cm$^3$.

(2) The polypropylene resin hollow molded foam article according to (1) above, having a resin layer on the outside and/or the inside of the foam layer.

(3) The polypropylene resin hollow molded foam article according to (1) or (2) above, wherein the hollow molded foam is molded by blowing a gas into the interior of a cylindrical foam.

(4) A process for the production of a polypropylene resin hollow molded foam article, in which a cylindrical foam having a foam layer is formed by extruding from a die a foamable molten resin comprising a base resin containing a foaming agent, and then placing said cylindrical foam in a mold while in a softened state, wherein the base resin is one selected from among the following (i), (ii), (iii), and (iv):

(i) a resin composed of at least 20 wt % and less than 70 wt % (a) polypropylene resin with a melt tension of at least 98 mN and a melt flow rate of 0.5 to 15 g/10 minutes and over 30 wt % and no more than 80 wt % (b) polypropylene resin with a melt tension of less than 30 mN (excluding 0) and a melt flow rate of 2 to 30 g/10 minutes (the combined amount of (a) and (b) being 100 wt %)

(ii) a resin composed of 30 to 70 wt % (c) polypropylene resin with a melt tension of at least 30 mN and less than 98 mN and a melt flow rate of 2 to 15 g/10 minutes and 30 to 70 wt % (b) polypropylene resin with a melt tension of less than 30 mN (excluding 0) and a melt flow rate of 2 to 30 g/10 minutes (the combined amount of (c) and (b) being 100 wt %)

(iii) a resin composed of at least 20 wt % and less than 70 wt % (a) polypropylene resin with a melt tension of at least 98 mN and a melt flow rate of 0.5 to 15 g/10 minutes and over 30 wt % and no more than 80 wt % (c) polypropylene resin with a melt tension of at least 30 mN and less than 98 mN and a melt flow rate of 2 to 15 g/10 minutes (the combined amount of (a) and (c) being 100 wt %)

(iv) a resin composed of (a) a polypropylene resin with a melt tension of at least 98 mN and a melt flow rate of 0.5 to 15 g/10 minutes, (b) a polypropylene resin with a melt tension of less than 30 mN (excluding 0) and a melt flow rate of 2 to 30 g/10 minutes, and (c) a polypropylene resin with a melt tension of at least 30 mN and less than 98 mN and a melt flow rate of 2 to 15 g/10 minutes, with (a) accounting for 5 to 65 wt %, (b) for 30 to 78 wt %, and (c) for 5 to 65 wt % (with the combined amount of (a), (b), and (c) being 100 wt %), and said resin having a composition within the bounds of a quadrangle ABCD (including on the lines of the quadrangle) drawn by connecting with straight lines the four points A (17, 78, 5), B (5, 72, 23), C (5, 30, 65), and D (65, 30, 5) which are component coordinates (x, y, z) where the polypropylene resin (a) component is given as x wt %, the polypropylene resin (b) component is given as y wt %, and the polypropylene resin (c) component is given as z wt % in a triangular component graph in which the upper vertex of a regular triangle is marked as 100 wt % polypropylene resin (a), the lower left vertex as 100 wt % polypropylene resin (b), and the lower right vertex as 100 wt % polypropylene resin (c).

(5) The process for the production of a polypropylene resin hollow molded foam article according to (4) above, wherein the cylindrical foam is a multilayer cylindrical foam having a resin layer on the outside and/or inside of the foam layer, obtained by co-extruding a foamable molten resin containing a foaming agent, and a non-foamable molten resin containing no foaming agent.

(6) The process for the production of a polypropylene resin hollow molded foam article according to (4) or (5) above, wherein the hollow molded foam is obtained by blowing a gas into the interior of a cylindrical foam placed in a metal mold.

(7) The process for the production of a polypropylene resin hollow molded foam article according to any of (4) to (6) above, wherein the foaming agent is a physical foaming agent containing carbon dioxide.

The hollow molded foam article of the present invention is a molded foam article having a foam layer whose surface is in a favorable state and which has excellent rigidity, adequate wall thickness, and low density.

With the present invention, in the production of a polypropylene resin hollow molded foam article using a foaming agent, a plurality of polypropylene resins having specific melt tensions and melt flow rates can be blended in a specific weight ratio, rather than using just one polypropylene resin with a high melt tension as the base resin. Therefore, a molded foam article having a foam layer whose surface is in a favorable state and which has adequate wall thickness and low density can be obtained stably. Furthermore, examining the melt tensions and melt flow rates makes it possible to use general purpose polypropylene resins or reused polypropylene resins, for example, which lowers the cost of the finished product thus obtained.

In the production process of the present invention, when the cylindrical foam is a multilayer cylindrical foam having a resin layer on the outside and/or inside of the foam layer, obtained by co-extruding a foamable molten resin containing a foaming agent, and a non-foamable molten resin containing no foaming agent, the molded foam article thus obtained has better dimensional precision, strength, and so on, and also has a better appearance.

In the process for producing a molded foam article of the present invention, if the molded foam article is formed from a cylindrical foam made with a physical foaming agent containing carbon dioxide, cooling after foam molding will take much less time and production efficiency will be boosted. Also, the obtained molded foam article will be less prone to problems such as sinks and blistering, and the physical strength such as compression stress will also be excellent.

DESCRIPTION OF THE PREFERRED EMBODIMENTS

Figure 1:
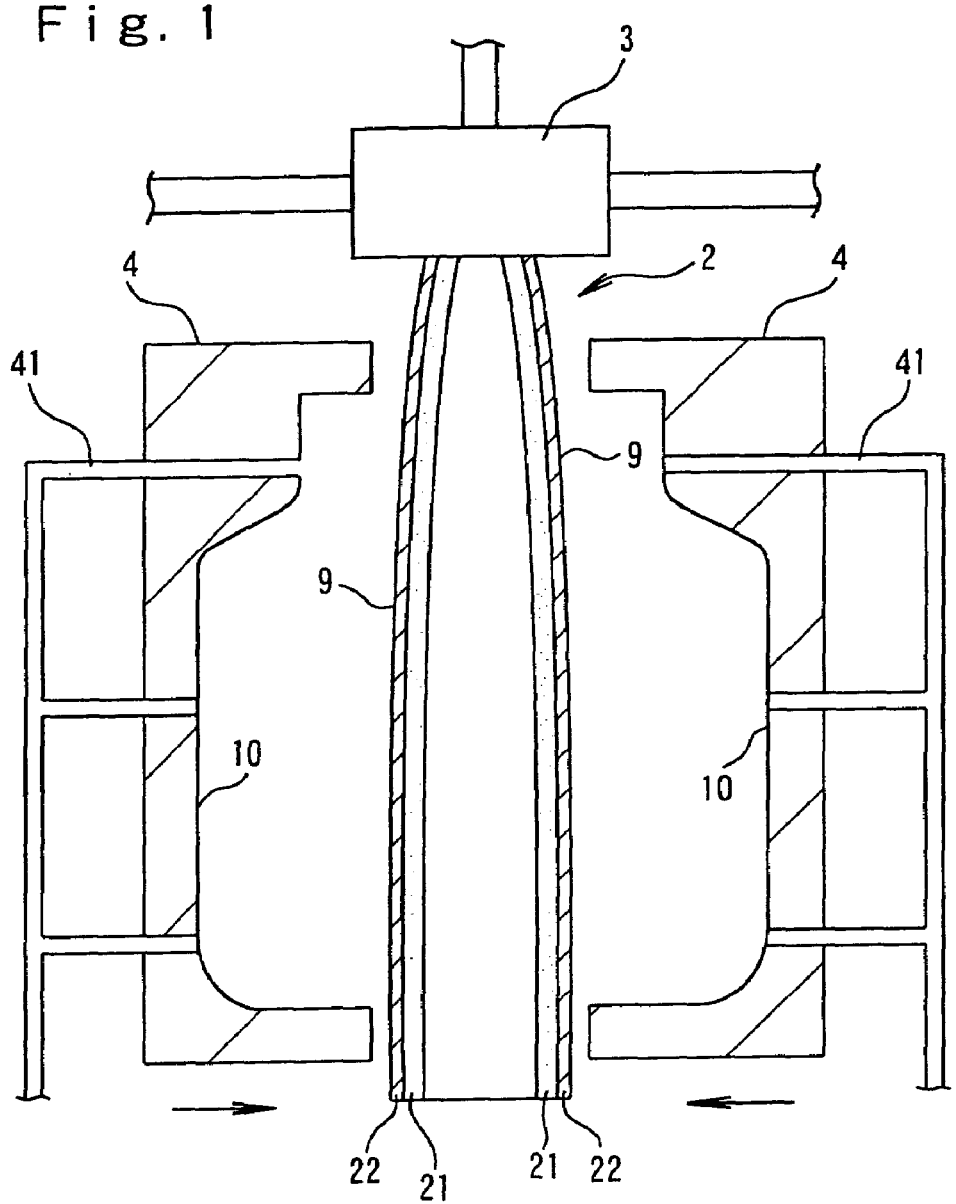
FIG. 1 is a diagram showing an example of a method of manufacture according to the present invention.

A hollow molded foam article (hereinbelow simply termed a "molded foam article") according to the present invention is formed by positioning a cylindrical foam in a softened state in a mold, this body having a polypropylene resin foam layer, the melt tension at 230° C. of the polypropylene resin forming this foam layer being at least 10 mN and less than 49 mN, and the apparent density of this foam layer being no more than 0.3 g/cm$^3$.

If the melt tension of the resin forming the foam layer of the hollow molded foam article according to the present invention is within the aforesaid range, an excellent balance is achieved between product cost and the requirement that the molded foam article should have a foam layer of low density with sufficient thickness and of excellent surface condition. From this point of view, the melt tension is more preferably at least 12 mN and less than 49 mN, or even more preferably at least 15 mN and less than 49 mN.

The apparent density of the foam layer 21 of the molded foam article according to the present invention is no more than 0.3 g/cm$^3$. If the apparent density exceeds 0.3 g/cm$^3$, there is a risk that the excessively large density will adversely affect such properties as light weight, impact damping ability, flexibility and thermal insulation that are characteristic of foam. From this point of view, a density of no more than 0.25 g/cm$^3$ is desirable. In particular, from the point of view that the molded foam article should display little generation of wrinkles caused by corrugation and should consequently have an excellent appearance, with little variability of thickness and density, a density of 0.07 to 0.3 g/cm³ is more preferable and 0.1 to 0.3 g/cm³ is even more preferable.

The average thickness of the foam layer 21 of the molded foam article according to the present invention depends on the shape of the target molded foam article but, usually, at least 1 mm is preferable, at least 2 mm is more preferable and at least 4 mm is particularly preferable. The upper limiting value is about 30 mm. Molded foam articles having such a thickness satisfy requirements in terms of physical properties such as heat insulation, sound installation, flexibility and heat resistance and are desirable since they may be suitably employed in various applications such as ducts, automobile components or containers. The same applies to the foam layer of multilayer molded foam articles.

The average thickness of the foam layer 21 is taken as the average thickness obtained by measuring the thickness of the foam layer at 10 equally spaced locations in the cross-section perpendicular to the direction of extrusion of the molded foam article and calculating the arithmetic mean of these measured values. However, since, depending on the shape of the molded foam article, some portions thereof may be crushed or stretched, in measurement of the average thickness of the foam layer 21 such portions should be avoided.

The average thickness of the resin layer in the case of a molded foam article having a resin layer according to the present invention should preferably be at least 0.3 mm and more preferably at least 0.5 mm, from the point of view of improving the rigidity of the molded foam article obtained. On the other hand, the upper limit is preferably no more than 5 mm or more preferably no more than 3 mm, from the point of view of achieving a balance of light weight and impact damping ability.

For the average thickness of the resin layer, values are adopted obtained by measuring the average thickness of the resin layer in the same way as when measuring the average thickness of the foam layer 21.

The average cell diameter of the foam layer 21 of the molded foam article according to the present invention preferably has a lower limit of at least 0.1 mm, or, more preferably, at least 0.3 mm and an upper limit of no more than 5.0 mm, more preferably no more than 3.0 mm, no more than 1.0 mm being particularly preferable.

If the average cell diameter is too small, wrinkles caused by furrow-shaped corrugations produced in the cylindrical foam tend to be generated in the molded foam article. On the other hand, if the average cell diameter is too large, there is a risk of impairing the appearance of the molded foam article and heat insulation, with the result that it may become unsuitable for certain applications.

The average cell diameter of the foam layer 21 is measured by a method in accordance with ASTM D 3576-77. Specifically, the cross-section of the foam layer is magnified and projected, a straight line is drawn in the thickness direction on this projected image, the number of cells intersecting this straight line is counted, and the length of the straight line on the image is divided by the number of cells, to obtain a value, which is then further divided by 0.616. Of the three intersecting directions (extrusion direction, width direction and thickness direction), the average cell diameter of the foam layer cross-section in the thickness direction is found in the cross-section in the extrusion direction and in the cross-section in the width direction, and the value found by obtaining the arithmetic mean of the average cell diameters in these cross-sections is then taken as the average cell diameter of the foam layer 21. The location of measurement is the middle region of the molded foam article. However, depending on the shape of the molded foam article, measurement should not be conducted at portions where the cells are considerably deformed, such as portions where the molded foam article is crushed or stretched.

The aforementioned molded foam article may for example be obtained by employing as the base resin a resin obtained by blending a combination of a plurality of polypropylene resins having melt tension and melt flow rate within a specified range. Specifically, the molded foam article is manufactured by forming a cylindrical foam having a foam layer by extrusion of foamable molten resin in which a foaming agent is contained in the base resin into a low-pressure zone from a die and then positioning this cylindrical foam, in a softened state, in a mold.

The method of manufacturing a molded foam article according to the present invention will be described with reference to an example of a molded foam article according to the present invention, with reference to the drawings.

For example, as shown in FIG. 1, foamable molten resin obtained by kneading a base resin and foaming agent in an extruder (not shown) is extruded from a die 3 into a low-pressure zone to form a cylindrical foam 2 having a polypropylene resin foam layer 21 (hereinbelow simply referred to as "foam layer"); if necessary, gas may be blown into the cylindrical foam. Next, this cylindrical foam is arranged in a divided type mold (hereinbelow simply referred to as a "mold") 4, 4 of the desired shape and the mold is closed so that the cylindrical foam is clamped by this mold. A molded foam article of a desired shape may be obtained by blowing in gas into the cylindrical foam 2, if required, concurrently with the closure of the mold. Preferably, obtaining a molded foam article by blowing in gas into the cylindrical foam 2 results in a molded foam article being obtained that accurately reflects the mold shape. Preferably, in the method according to the present invention, an accumulator is arranged between the extruder and the die 3 or within the die.

Also, as shown in FIG. 1, by employing a mold provided with pressure reduction piping 41 for the mold 4, 4, good adhesion between the outside surface 9 of the cylindrical foam and the inside surface 10 of the mold 4 can be achieved by forming while reducing pressure while the mold is closed; in this way, a molded foam article that more accurately reflects the mold shape can be obtained and a molded foam article of excellent appearance can be obtained.

While the mode of the hollow molded foam article depends on the method of molded foam article and on the shape of the molded foam article that is obtained, as shown in FIG. 1, a mode in which the molded article is open at the bottom and a balloon-shaped mode, in which the top and bottom of the cylindrical foam are closed, can be obtained.

According to the present invention, a multilayer cylindrical foam may be formed having a resin layer on the outside and/or inside of the foam layer by co-extrusion of foamable molten resin and non-foamable molten resin and a multilayer molded foam article may be obtained by molding this multilayer cylindrical foam using the same method as described above.

Figure 2:
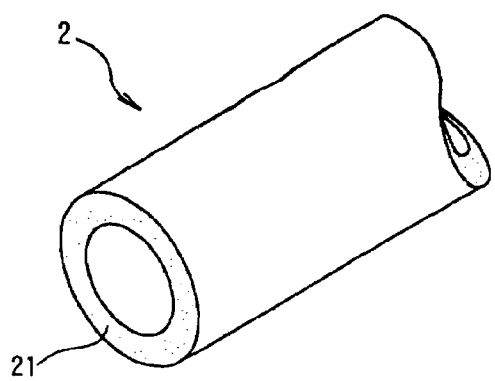
FIG. 2 is a partially cut away perspective view showing an example of a cylindrical foam employed in a method of manufacture according to the present invention.
Figure 2:
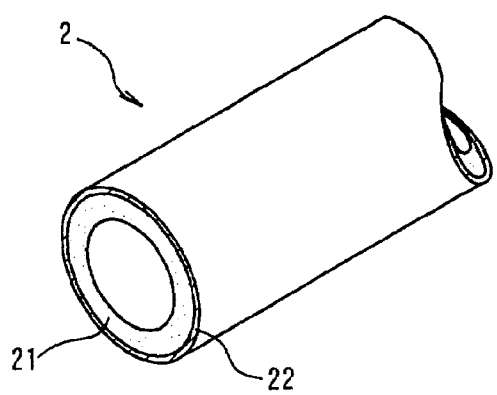
Figure 2:
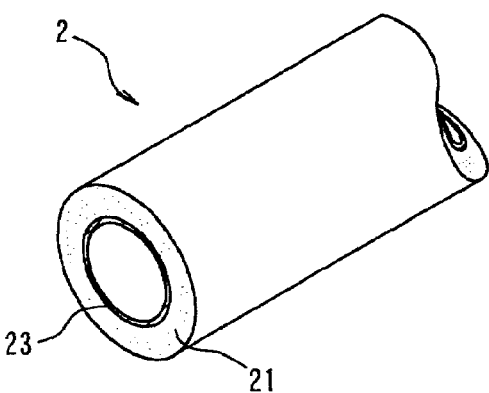
Figure 2:
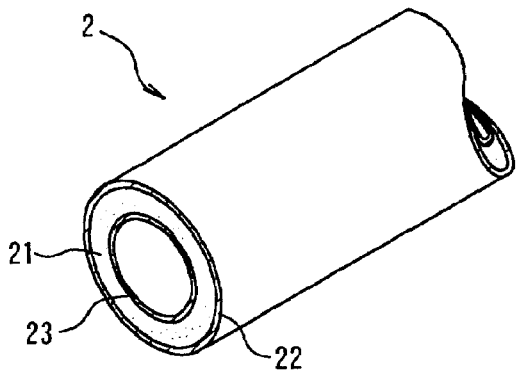

For example, in forming a multilayer cylindrical foam 2, the base resin forming each layer is melt-kneaded within respective separate extruders (not shown) and is then extruded to a low pressure zone from a die 3 while merging and laminating these layers within the die 3, to obtain various types of cylindrical foam 2, of which examples are shown in FIG. 2. FIG. 2 shows a partially cut away perspective view of a multilayer cylindrical foam. In FIG. 2, (b), (c) and (d) show multilayer cylindrical foam having a resin layer on the outside and/or inside of a foam layer. 21 indicates the foam layer and 22 and 23 indicate resin layers, respectively. Regarding the molded foam article obtained from the multilayer cylindrical foam 2, a molded foam article of multilayer construction having a resin layer on the outside and/or inside of a foam layer may be obtained corresponding to the construction of the multilayer cylindrical foam. Molded articles of excellent resistance to surface damage can be obtained thanks to the improved surface strength achieved by using a molded article having a resin layer on the outside surface of a foam layer.

Figure 3:
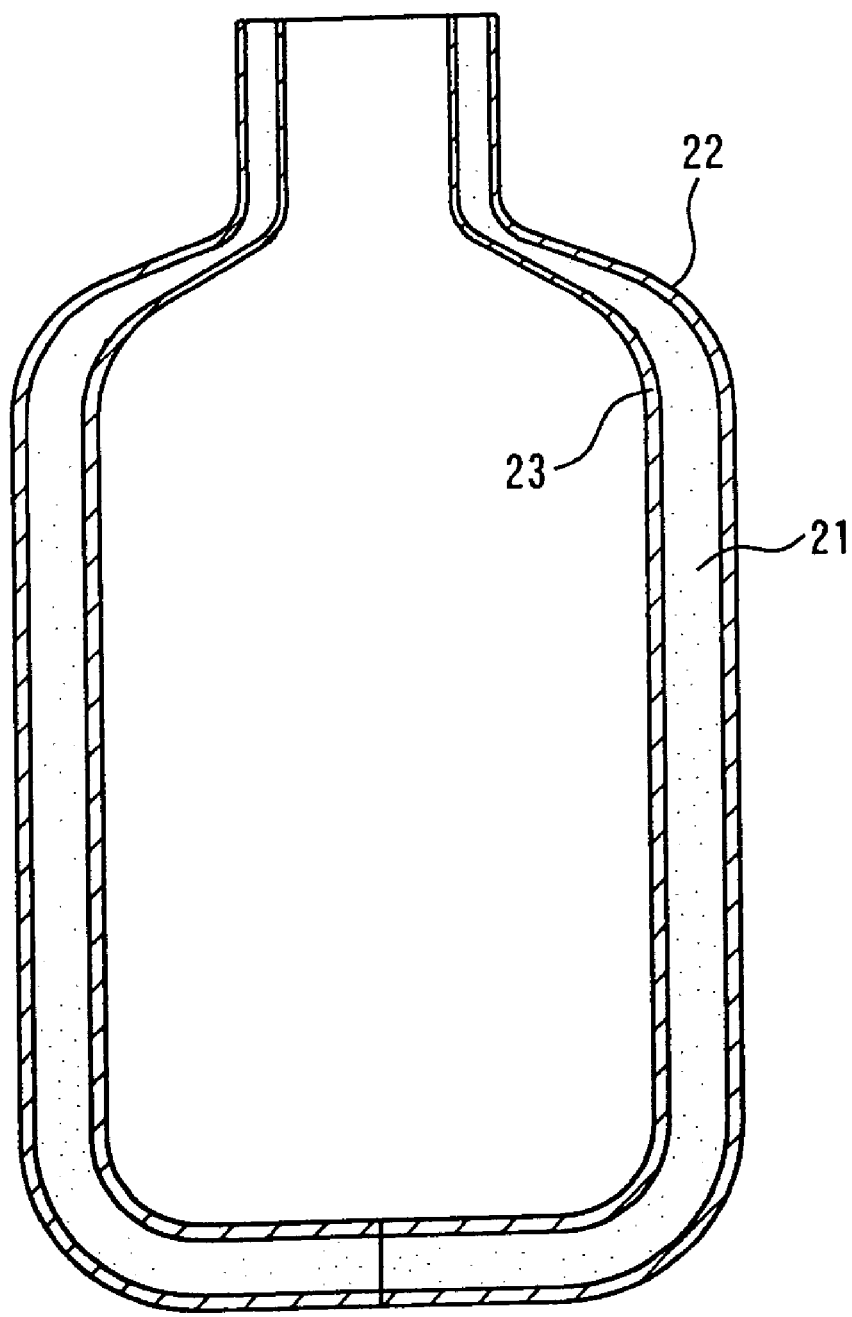
FIG. 3 is a cross-sectional view of a hollow molded foam article of bottle shape according to the present invention.

FIG. 3 shows an example of a molded foam article obtained from a multilayer cylindrical foam 2 of the construction of FIG. 2(d). The molded foam article of bottle shape shown in FIG. 3 is a molded foam article, i.e. a bottle-shaped molded foam article having a resin layer on the inside face and outside face obtained by so-called blow molding, obtained by arranging a cylindrical foam 2 in a softened state having resin layers 22, 23 as shown in FIG. 2(d) in the cavity of a bottle-forming mold as shown in FIG. 1, closing the mold and reducing the pressure between the outside face of the cylindrical foam 2 and the inside faces of the mold (molding faces) and/or blowing in air from an air supply nozzle (not shown) into the interior of the cylindrical foam 2, so that the outside face of the cylindrical foam 2 adheres to the inside faces (molding faces) of the mold.

According to the present invention, as the base resin, a resin is employed obtained selecting two or more from the polypropylene resin (a), polypropylene resin (b) and polypropylene resin (c) indicated below, respectively, and blending these in a specified ratio. By adopting such a composition, a plurality of polypropylene resins having specific melt tension and melt flow rate can be blended in a specified weight ratio without needing to employ only restricted specific polypropylene resins having a specific melt tension and melt flow rate. A thick molded foam article can thereby be obtained having an excellent appearance and a high foaming factor. In addition, by examining the melt tension and melt flow rate, for example reused polypropylene resin or general purpose polypropylene resin and the like may be employed, making it possible to obtain a thick molded foam article with low production cost.

The polypropylene resin (a) employed in the present invention have a melt tension (MT) of at least 98 mN and a melt flow rate (MFR) of 0.5 to 15 g/10 minutes. The polypropylene resin (b) that are employed have a melt tension (MT) of less than 30 mN and a melt flow rate (MFR) of 2 to 30 g/10 minutes. Also, the polypropylene resin (c) that are employed have a melt tension (MT) of at least 30 mN but less than 98 mN and a melt flow rate (MFR) of 2 to 15 g/10 minutes.

As the aforementioned polypropylene resin (a), polypropylene polymers are employed comprising propylene homopolymer, a copolymer of propylene and another copolymerizable monomer having a propylene content of at least 60 wt %. As the copolymerization component of the copolymer, ethylene, butylene or other α-olefins may be mentioned by way of example. Desirably the α-olefin is an olefin of carbon number no more than 12, preferably no more than 8. Also, preferably the polypropylene resin (a) has free terminal long-chain branching in the molecular structure; specific examples include the high melt tension polypropylene "PF 814" (homopolypropylene) and the "SD632" (propylene-ethylene block copolymer) manufactured by San Alomar Company Ltd.

As the aforementioned polypropylene resin (b), specifically, there may be employed comprising propylene homopolymer, a copolymer of propylene and another copolymerizable monomer having a propylene content of at least 60 wt % of for example propylene homopolymer or copolymer, which, in contrast to the polypropylene resin (a), which is of excellent foaming ability, are general purpose polypropylene resins that do not have free terminal long-chain branching. As the copolymerization component of the copolymer, ethylene, butylene or other α-olefins may be mentioned by way of example. Desirably the α-olefin is an olefin of carbon number no more than 12, preferably no more than 8.

Also, as the aforementioned polypropylene resin (c), there may be employed comprising propylene homopolymer, a copolymer of propylene and another copolymerizable monomer having a propylene content of at least 60 wt %. As the copolymerization component of the copolymer, ethylene, butylene or other α-olefins may be mentioned by way of example. Desirably the α-olefin is an olefin of carbon number no more than 12, preferably no more than 8. As the polypropylene resin (c), there may be indicated by way of example polypropylene resins in which a superpolymer polyolefin component such as polypropylene or polyethylene is dispersed without unevenness of distribution in polypropylene resin by a catalytic technique or polypropylene resins having free terminal long-chain branching or polypropylene obtained by improving polypropylene resin using isoprene monomer or the like. As a specific example of a polypropylene resin in which a superpolymer polyolefin component such as polypropylene or polyethylene is dispersed without unevenness of distribution in polypropylene resin by a catalytic technique there may be mentioned "NEWFOAMER FH 3400" (melt tension 54 mN, melt flow rate 4 g/10 minutes) manufactured by Chisso corporation. Of the above, resins having free terminal long-chain branching are preferable. Specific examples of resins having free terminal long-chain branching include raw materials whose melt tension and melt flow rate are in the aforementioned ranges, consisting of reused resin of molded products using reused resin or reused resin of molded foam articles or sheets using the polypropylene resin (a) as chief raw material and molded articles obtained by heat molding sheets in a mold. Materials using the polypropylene resin (a) as chief raw material means materials employing at least 50 wt % of polypropylene resin (a).

With the present invention, foaming conditions such as the foaming suitability temperature or molten viscosity can easily be adjusted over a wide range, thereby making it possible to obtain stable foam moldability. Also, with the present invention, manufacturing costs can be lowered since it is possible to select inexpensive polypropylene resin (b) over a wide range or to employ reused resin from molded articles.

In the method according to the present invention, the base resin is selected from the following (i), (ii), (iii) or (iv). (i) if a combination of the aforementioned specified polypropylene resin (a) and polypropylene resin (b) is employed, the blending ratio of these two in the base resin is: polypropylene resin (a) at least 20 wt % but less than 70 wt %; polypropylene resin (b) more than 30 wt % but no more than 80 wt %, the combined amount of (a) and (b) being 100 wt %. If the blending ratio of the polypropylene resin (b) is 30 wt % or less, the cylindrical foam extruded from the die tends to expand in the circumferential direction; although, in the case where the molded foam article is of linear shape, a molded foam article of good appearance can be obtained by for example performing adjustment by blowing in gas, in the case of complex shapes, wave-shaped corrugation marks tend to be left in the surface of the molded foam article obtained, so, as a result, it becomes difficult to obtain a good molded foam article.

Also, if the blending ratio of the expensive polypropylene resin (a) component becomes large, it is difficult to achieve sufficient reduction in product costs. It is therefore more preferable that the content of the polypropylene resin (b) should be at least 40 wt % and even more preferably at least 50 wt %.

On the other hand, if the content of the polypropylene resin (b) exceeds 80 wt %, it becomes difficult to maintain a good foaming suitability condition, so it becomes difficult to obtain thick, low-density molded foam articles. It is therefore preferable that the content of the polypropylene resin (b) should be no more than 75 wt % and even more preferably should be no more than 70 wt %.

The polypropylene resin (a) employed in the present invention has a melt tension and melt flow rate as described above. If the melt tension of the polypropylene resin (a) is less than 98 mN, even though the blending amount is within the range described above, thick, low-density molded foam articles are difficult to obtain, so the melt tension is preferably at least 150 mN and more preferably at least 200 mN. On the other hand, in the method according to the present invention, if the melt tension exceeds 400 mN, extrusion moldability is lowered in that for example fluidity is adversely affected, resulting in the load acting on the screw during extrusion becoming extremely high. Consequently, taking into account extrusion moldability, it is preferable that the melt tension should be no more than 300 mN and more preferably no more than 250 mN.

If the melt flow rate is lower than 0.5 g/10 minutes, fluidity is adversely affected, with a risk of lowering of extrusion moldability. On the other hand, if the melt flow rate exceeds 15 g/10 minutes, the draw-down becomes large, tending to produce unevenness of thickness in the molded foam article that is finally obtained and risking impairing molding stability. The melt flow rate is therefore preferably 1 to 10 g/10 minutes and more preferably 2 to 5 g/10 minutes.

The polypropylene resin (b) employed in the present invention has a melt tension and melt flow rate as described above. From the point of view of making it possible to keep the load applied to the screw during extrusion low and being able to obtain a thick, low-density molded foam article efficiently, it is preferable that the melt tension of the polypropylene resin (b) should be no more than 15 mN and more preferably no more than 10 mN. The lower limit is about 1 mN. Usually, there are substantially no general purpose polypropylene resins whose melt tension exceeds 30 mN and the melt tension of the polypropylene resin (b) in the method of the present invention is less than 30 mN; in the case of polypropylene resins whose melt tension exceeds 30 mN, a large load acts on the screw during extrusion and, in addition, resins whose melt tension exceeds 30 mN are more expensive than general purpose resins, so even if their blending amount is within the range specified above, the overall raw material cost becomes high and, as a result, the product cost is increased; they are therefore undesirable. Also, if the melt flow rate is lower than 2 g/10 minutes, extrusion moldability is lowered in that for example fluidity is adversely affected and, due to evolution of heat during extrusion, a cylindrical foam having a low-density foam layer is not obtained.

On the other hand, if the melt flow rate exceeds 30 g/10 minutes, the draw-down of the cylindrical foam becomes large, tending to produce unevenness of thickness in the molded foam article that is finally obtained and risking impairing molding stability with the result that a good molded foam article is not obtained. The melt flow rate of the polypropylene resin (b) is therefore preferably 5 to 20 g/10 minutes and more preferably 5 to 15 g/10 minutes.

In the method of manufacture according to the present invention, if (ii), as the base resin, a combination of polypropylene resin (c) and polypropylene resin (b) is employed, the blending ratio of these two in the base resin is: polypropylene resin (c) 30 to 70 wt %; polypropylene resin (b) 30 to 70 wt %. The total amount of (c) and (b) is 100 wt %. If the blending ratio of the resin (b) is less than 30 wt %, the cylindrical foam extruded from the die tends to expand in the circumferential direction; although, in the case where the molded foam article is of linear shape, a molded article of good appearance can be obtained by for example performing adjustment by blowing in gas, in the case of complex shapes, wave-shaped corrugation marks tend to be left in the surface of the molded foam article obtained, so, as a result, it becomes difficult to obtain a good molded foam article. Furthermore, since there is a risk that, otherwise, sufficient reduction of product costs might not be achieved, more preferably the content of the polypropylene resin (b) is at least 40 wt %. On the other hand, if the content exceeds 70 wt %, there is a risk that the foamability may be lowered, with the result that a thick, low-density molded foam article is not obtained; more preferably, therefore, the content of the polypropylene resin (b) is no more than 60 wt %.

It should be noted that the reason why, in the combination of polypropylene resin (c) and (b), the blending ratio of the polypropylene resin (b) has a smaller upper limiting value of 70 wt % than in the case of the blending ratio of (b) in the combination consisting of the polypropylene resin (a) and (b) referred to above is that the foamability of the polypropylene resin (c) is lower than that of the polypropylene resin (a), so, unless the blending amount of (b) is less, at 70 wt %, a good molded foam article cannot be obtained.

The polypropylene resin (c) employed in the present invention has a melt tension and melt flow rate as described above. If the melt tension of the polypropylene resin (c) is less than 30 mN, with the blending amount of the resin (c) in the combination of polypropylene resin (b) and polypropylene resin (c) referred to above, thick, low-density molded foam articles would not be obtained, so the melt tension is preferably at least 40 mN and more preferably at least 50 mN. On the other hand, from the point of view of stable extrusion moldability when extruding when obtaining the cylindrical foam, and product cost, preferably the melt tension is no more than 90 mN, more preferably no more than 80 mN. Also, if the melt flow rate of the polypropylene resin (c) is lower than 2 g/10 minutes, extrusion moldability is lowered in that for example fluidity is adversely affected and a cylindrical foam having a low-density foam layer cannot be obtained, due to evolution of heat when extruding.

On the other hand, if the melt flow rate exceeds 15 g/10 minutes, the draw-down of the cylindrical foam becomes large, producing unevenness of thickness in the molded foam article that is finally obtained and impairing molding stability so that a good molded foam article is not obtained. The melt flow rate of the polypropylene resin (c) is therefore preferably 5 to 10 g/10 minutes.

In the method of manufacture according to the present invention, if (iii), as the base resin, a combination of polypropylene resin (a) and polypropylene resin (c) is employed, the blending ratio of these two in the base resin is: polypropylene resin (a) at least 20 wt % and less than 70 wt %; resin (c) more than 30 and no more than 80 wt % (the combined amount of (a) and (c) being 100 wt %.).

If the blending ratio of the resin (c) is an amount of less than 30 wt %, the cylindrical foam extruded from the die tends to expand in the circumferential direction; although, in the case where the molded foam article is of linear shape, a molded article of good appearance can be obtained by for example performing adjustment by blowing in gas, in the case of complex shapes, wave-shaped corrugation marks tend to be left in the surface of the molded foam article obtained, so, as a result, it becomes difficult to obtain a good molded foam article. Furthermore, since there is a risk that, otherwise, sufficient reduction of product costs might not be achieved, more preferably the content of the polypropylene resin (c) is at least 40 wt %. On the other hand, if the content exceeds 80 wt %, there is a risk that foamability may be lowered, with the result that a thick, low-density molded foam article is not obtained; more preferably, therefore, the content of the polypropylene resin (c) is no more than 70 wt %.

Next, in the method of manufacture according to the present invention, the case (iv) in which, as the base resin, a combination of three polypropylene resin (a), polypropylene resin (b) and polypropylene resin (c) is employed will be described. If polypropylene resin (a), (b) and (c) are employed, a base resin is employed consisting of a component composition in the range of the quadrangle A, B, C, D (and including on the lines of the quadrangle) defined by joining up with straight lines the four points represented by point A (17, 78, 5), B (5, 72, 23), C (5, 30, 65) and D (65, 30, 5) represented by component co-ordinates constituted by the points (x, y, z), as shown in FIG. 5, where the content of this polypropylene resin (a) component is x wt %, the content of this polypropylene resin (b) component is y wt % and the content of this polypropylene resin (c) component is z wt %, on a triangle component diagram in which this polypropylene resin (a) 100 wt % is marked at the upper vertex of the regular triangle, this polypropylene resin (b) 100 wt % is marked at the lower left vertex and this polypropylene resin (c) 100 wt % is marked at the lower right vertex and in which the content of polypropylene resin (a) is 5 to 65 wt %, the content of polypropylene resin (b) is 30 to 78 wt % and the content of polypropylene resin (c) is 5 to 65 wt % (where the total content of (a), (b) and (c) is 100 wt %).

In blends of the above three resin components, blends in which the sum of the blending ratios of polypropylene resin (a) and polypropylene resin (c) is at least 30 wt % are preferable in that thicker molded foam articles with low density are obtained. On the other hand, in order to achieve an excellent appearance of the molded foam article and to achieve a sufficient reduction in product costs, it is desirable that (a) and (c) should be no more than 65 wt %.

With a composition consisting of polypropylene resin (a), (b) and (c), it was found that, by blending at least 5 wt % in each case of the polypropylene resin (a) and (c), as the base resin, the surface smoothness of the molded foam article tended to be improved and the ratio of the closed cells in the molded foam article obtained tended to be higher, compared with a composition consisting of polypropylene resin (a) and (b) or a combination consisting of polypropylene resin (b) and (c) as described above. It is inferred from this that the polypropylene resin (c) in the composition comprising polypropylene resin (a), (b) and (c) may have the effect of rendering the condition of dispersion of the polypropylene resin (a) and (b) more uniform.

Figure 5:
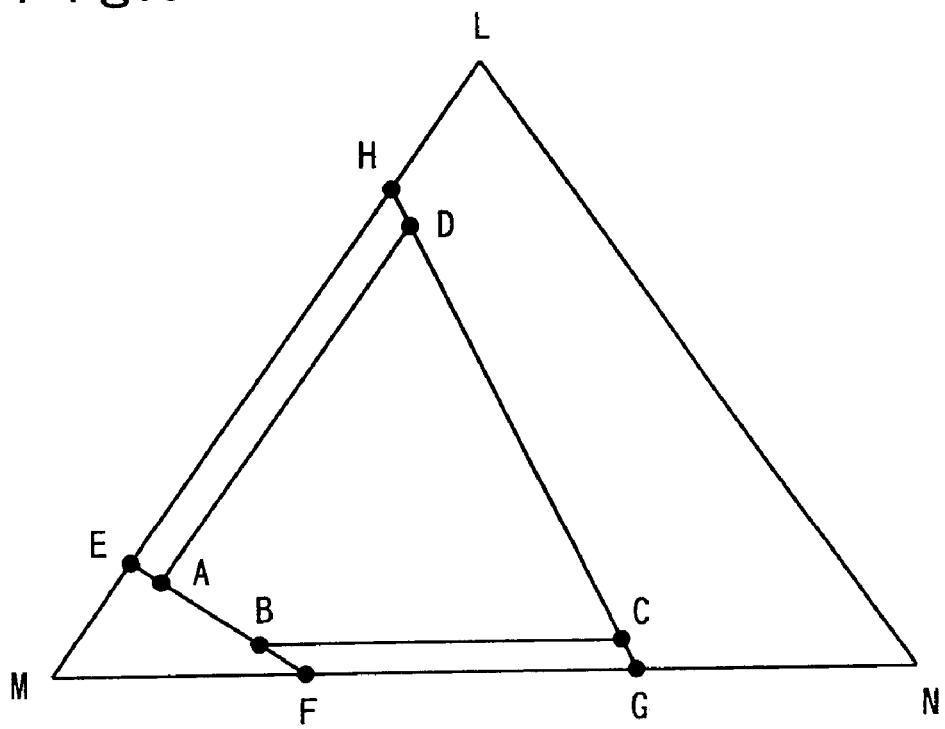
FIG. 5 is a triangular component diagram showing the component composition employing three components (a), (b), and (c) as the base resin according to the present invention.

In the above three types of combination, in the case where the blended amount of resin (b), of the polypropylene resin (a), (b) and (c), is less than 30 wt %, in the case of resin compositions indicated by the quadrangular region defined by H (70, 30, 0), G (0, 30, 70), N (0, 0, 100), L (100, 0, 0) in the component coordinates shown in FIG. 5, sufficient lowering of the product costs is not achieved; furthermore, the cylindrical foam extruded from the die tends to expand in the circumferential direction; although, in the case where the molded foam article is of linear shape, a molded article of good appearance can be obtained by for example performing adjustment by blowing in gas, in the case of complex shapes, wave-shaped corrugation marks tend to be left in the surface of the molded foam article obtained, so, as a result, there is a risk of it becoming difficult to obtain a good molded foam article.

On the other hand, of the resin (a), resin (b) and resin (c), if the blending amount of resin (b) exceeds 78 wt %, in the component coordinates shown in FIG. 5, in the case of resin compositions in the region indicated by the triangle defined by E (20, 80, 0), M (0, 100, 0), F (0, 70, 30), foamability is lowered with the result that a thick, low-density molded foam article is not obtained.

Also, in the above three types of combination, of the resin (a), resin (b) and resin (c), if the blending amount of resin (c) is less than 5 wt %, in the component coordinates shown in FIG. 5, in the case of resin compositions in the region indicated by the quadrangle defined by E (20, 80, 0), A (17, 78, 5), D (65, 30, 5) and H (70, 30, 0), a molded foam article with a high ratio of the closed cells is not obtained and surface smoothness is lowered. These phenomena are more marked as the blending amount of resin (b) is increased.

In addition, in the above three types of combination, of the resin (a), resin (b) and resin (c), if the blending amount of resin (a) is less than 5 wt %, in the component co-ordinates shown in FIG. 5, in the case of resin compositions indicated by the quadrangular region defined by B (5, 72, 23), F (0, 70, 30), G (0, 30, 70) and C (5, 30, 65), a molded foam article with a high ratio of the closed cells is not obtained and there is a risk of surface smoothness being lowered. These phenomena are more marked as the blending amount of resin (b) is increased.

In these three types of combination, the reason that an upper limiting value of the blending ratio of resins of (b) of up to 72 wt % or up to 78 wt %, on the straight line AB shown in FIG. 5 can be allowed is that excellent molded foam articles are obtained even if the blending amount of resin (b) is large, compared with a resin composition consisting of a combination of two of resin (c) and resin (b), since a high upper limiting value of the blending amount of resin (b) can be employed, because resin (a) which is of particularly excellent foaming ability and resin (c) which is of excellent foaming ability compared with resin (b) is included in a resin composition consisting of a combination of resin (c) and resin (b) according to the present invention. In a resin composition consisting of a combination of resin (a) and resin (b) according to the present invention, since resin (a) which is of particularly excellent foaming ability are included, excellent molded foam articles can be obtained even if the upper limit of the blending amount of resin (b) is large, at 80 wt %.

In a method of manufacture according to the present invention, a resin mixture produced by selecting and combining at least two or more of polypropylene resin (a), (b), or (c) having respectively a specific melt tension and melt flow rate is employed as the base resin, as described above; however, it is desirable, in that a thick molded foam article of low density and attractive appearance can be obtained and product costs can be lowered, to adjust the melt tension of this mixture so as to be less than 98 mN.

It should be noted that it is possible to add other resins within a range such as not to interfere with the object and beneficial effect of the present invention to the aforementioned polypropylene resins constituting the base resin, in the manufacture of a molded foam article according to the present invention. If this is done, preferably the added amount of such other resins is no more than 20 wt % and more preferably no more than 30 wt %, or even more preferably no more than 10 wt %.

There is no particular restriction concerning such other resins but there may be mentioned by way of example the use of thermoplastic resins such as polyethylene resins or polystyrene resins, as resins for constituting a resin layer of a cylindrical foam, to be described.

According to the present invention, in the case of all of the base resins of a combination according to the present invention, a cylindrical foam 2 is formed by producing foamable molten resin containing foaming agent by heating and kneading foaming agent and the base resin in an extruder, followed by extrusion of this molten resin from a die into a hollow shape with an extrusion rate per unit area (hereinbelow simply termed "extrusion rate") of at least 15 kg/hr·cm$^2$, preferably at least 35 kg/hr·cm$^2$ and even more preferably at least 50 kg/hr·cm$^2$. The upper limit of the extrusion rate is about 500 kg/hr·cm$^2$, though this depends on the capacity of the extruder. The extrusion rate referred to in the presence specification is a value obtained by dividing the extrusion amount (kg/hr) of foamable molten resin extruded from the die mounted at the leading end of the extrusion device by the area of the aperture of this die. However, if the method is adopted of performing intermittent extrusion of molten resin from a die typically used to perform blow molding, when the cylindrical foam is formed, since the molten resin is extruded intermittently by changing from a condition in which the aperture of this die is close to a condition in which it is open, the area of the aperture changes during extrusion of the molten resin and in some cases the extrusion amount of molten resin may also change. In such cases, in order to find the extrusion rate, for the amount of extrusion when the area of the aperture has become a maximum, which changes in terms of the extrusion amount of molten resin, the maximum value of the area of the aperture, which changes in terms of the area of the aperture of the die, is adopted and calculated as described above. The extrusion rate described above is also adopted in the case where, by the co-extrusion method, molten resins are extruded from the aperture of the die after merging with another non-foamable molten resin and/or foamable molten resin within the die.

If the aforementioned extrusion rate is too small, even though a base resin is employed of no matter what combination according to the present invention, it is difficult to obtain a cylindrical foam having a thick foam layer and having a foam layer of small apparent density and the physical strength, heat insulation and appearance of the molded foam article obtained by molding this cylindrical foam with a desired mold are adversely affected.

Contrariwise, if the extrusion rate is too large, a large amount of heat is emitted on extrusion of this molten resin from the die, with the risk that a molded foam article of low density (i.e. of high expansion ratio) may not be obtained, due to breakdown of the cells of the foam layer.

As the foaming agents employed in the method according to the present invention, there may be listed by way of example aliphatic hydrocarbons such as propane, normal butane, isobutane, normal pentane, isopentane, normal hexane, isohexane or cyclohexane; chlorinated hydrocarbons such as methyl chloride or ethyl chloride; fluorinated hydrocarbons such as 1, 1, 1, 2-tetrafluoroethane, or 1, 1-difluoroethane; aliphatic ethers such as dimethyl ether, diethyl ether, or methyl ethyl ether; aliphatic alcohols such as methyl alcohol, or ethyl alcohol; organic physical foaming agents such as dialkyl carbonates such as dimethyl carbonate or diethyl carbonate; inorganic physical foaming agents such as carbon dioxide, nitrogen, air or water; or decomposable chemical foaming agents such as sodium hydrogen carbonate, sodium citrate or azodicarbonamide. These foaming agents may be employed in mixed form. In the method according to the present invention, of the foaming agents listed above, physical foaming agents, in particular physical foaming agents containing carbon dioxide, are preferable. As physical foaming agents containing carbon dioxide, there may be employed simply carbon dioxide or a mixed physical foaming agent comprising carbon dioxide and another physical foaming agent.

Since the solubility of the carbon dioxide that is employed as the foaming agent with respect to polypropylene resins is smaller than that of organic physical foaming agents such as butane, although the carbon dioxide dissolves in the polypropylene resins of the base resin and the high pressure in the extruder, when released from the die to atmospheric pressure, the carbon dioxide is suddenly gasified and separates from the polypropylene resins. Consequently, if carbon dioxide or a physical foaming agent containing carbon dioxide is employed to form the foam layer, since this foaming agent is rapidly gasified so that cell formation is quickly completed and since scarcely any or none at all of this foaming agent is left in the resin, there is no possibility of the resin being plasticized and a cylindrical foam can therefore be obtained having a foam layer that is in a harder softened state than that of a cylindrical foam obtained using an organic physical foaming agent.

When a molded foam article of the shape of the hollow region of the mold is obtained by molding and cooling such a cylindrical foam in a separable mold, the desired shape can be satisfactorily maintained even though the molded foam article is withdrawn from the mold at rather a high temperature and a molded foam article of excellent physical strength such as compression strength can be obtained; there are therefore the benefits that the cooling time after molding the molded foam article can be considerably shortened and production efficiency raised by employing a physical foaming agent containing carbon dioxide as the foaming agent.

Also, carbon dioxide is non-combustible, so the curing time for preventing ignition of a molded foam article formed using a physical foaming agent containing carbon dioxide is shortened. Furthermore, since combustible gas such as butane is not employed, safety during manufacture and flame retardance of the molded foam article obtained are improved.

It should be noted that, even if a mixed physical foaming agent containing carbon dioxide (mixed foaming agent of carbon dioxide and another, organic physical foaming agent) is employed, a similar beneficial effect can be obtained as in the case where a foaming agent consisting of carbon dioxide is employed, since the employed amount of organic physical foaming agent, such as butane employed as physical foaming agent, is reduced, albeit there may be some difference in the level of the effect.

Preferably 0.1 to 0.8 mol of the physical foaming agent (in the case of use of a mixed physical foaming agent, the total amount of physical foaming agents) per 1 kg of base resin constituting the foaming layer of the cylindrical foam is added and more preferably 0.2 to 0.5 mol thereof is added.

Depending on the application, it is undesirable for the amount of this physical foaming agent added to be less than 0.1 mol per 1 kg of base resin constituting the foam layer of the cylindrical foam, since the apparent density of the foam layer becomes large, resulting in a molded article of inferior heat insulation and lacking in lightweight characteristics. On the other hand, if the amount of the physical foaming agent exceeds 0.8 mol, this risks the molded foam article being of lowered apparent density and the closed cell ratio, with poor appearance, due to the cells collapsing due to the cell film being unable to withstand the foaming force produced by abrupt gasification of the large content of foaming agent.

In the method of the present invention, if a physical foaming agent containing carbon dioxide is employed as the foaming agent, preferably the content of carbon dioxide is 20 to 100 mol % with respect to 100 mol % of the physical foaming agent. More preferably the content of carbon dioxide is 50 to 100 mol % and even more preferably 70 to 100 mol %. With a foaming agent with such a blending ratio, the foam layer of the cylindrical foam is abruptly cooled by the abrupt gasification, so a cylindrical foam with fine cell size and a high ratio of the closed cells can be obtained.

Also, if a physical foaming agent containing carbon dioxide is employed, as described above, the extent to which the polypropylene resin is plasticized by the foaming agent is small, or no plasticization takes place, so a molded foam article of excellent dimensional stability and strength can be obtained, in particular a molded foam article of excellent dimensional stability and strength can be obtained immediately after extraction from the mold or a very short time after extraction therefrom. In particular, if polypropylene resins of straight-chain form are employed as the base resin, the crystallization speed of the straight-chain polypropylene resins is faster than the crystallization speed of polypropylene resins having free terminal long-chain branching in the molecular structure, so there is a synergetic effect with the physical foaming agent containing carbon dioxide and the benefit in terms of shortening of cooling time is considerable.

Various types of additives such as cell adjustment agents, ultraviolet absorbing agents, infra-red absorbing agents, infra-red reflecting agents, flame retardant agents, fluidity improvers, weatherproofing agents, coloring agents, heat stabilizers, antioxidants, or fillers may be added to the base resin constituting the foam layer in the present invention, in accordance with requirements.

The melt tension (MT) in this specification was measured using a melt tension tester type II manufactured by Toyo Seiki Seisaku-sho, Ltd., extruding the resin into cord form under the extrusion conditions: molten resin temperature 230° C., piston speed 10 mm/minutes, using a cylindrical orifice having a straight passage of length 8 mm, passage diameter 2.095 mm, engaging this cord with a tension detection pulley of diameter 45 mm and then coiling with a coiling roller of diameter 50 mm while gradually increasing the speed of coiling, with a ratio of about 5 rpm/second (coiling acceleration of the cord: $1.3 \times 10^{-2}$ m/second$^2$).

In order to find the melt tension, the coiling speed is increased until the cord hooked on the tension detection pulley breaks, to find the coiling speed: R (rpm) when the cord breaks. Next, winding of the cord is again performed at a fixed winding speed of R×0.7 (rpm) and the change with time of the melt tension of the cord detected by the detector linked with the tension detection pulley is measured; this change is shown on a graph taking the melt tension as the vertical axis and the time as the horizontal axis, to obtain a graph having an amplitude as shown in FIG. 4.

Figure 4:
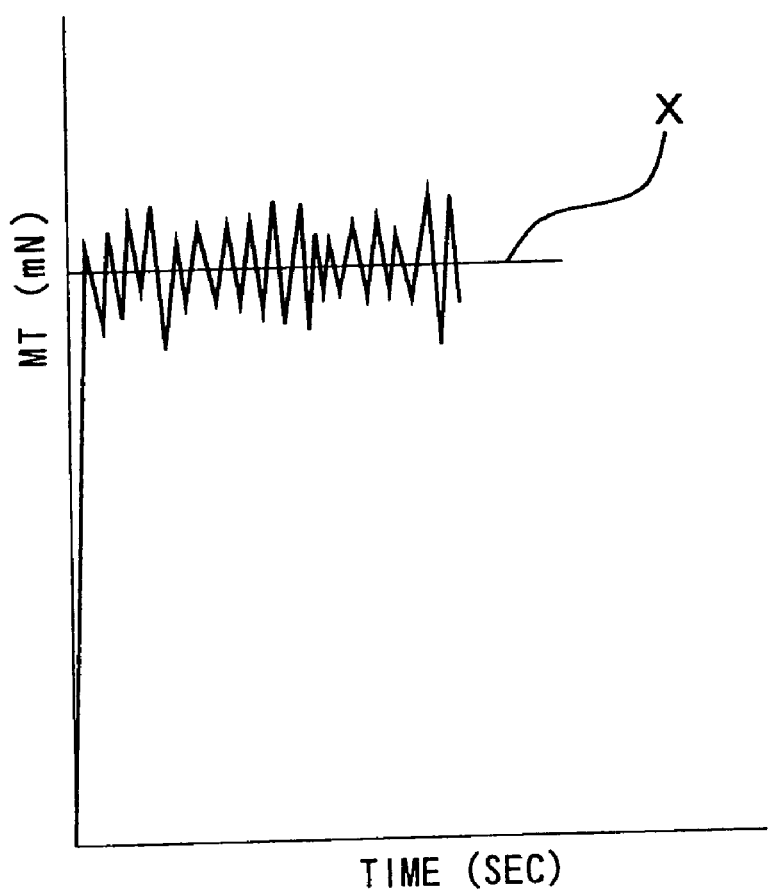
FIG. 4 is a graph showing the relationship between melt tension and time in measurement of melt tension.

As the melt tension in this specification, the central value (X) of the amplitude of the stable portion of the amplitude as shown in FIG. 4 is taken. However, if the cord has not broken even on reaching a coiling speed of 500 rpm, the melt tension of the cord is found from the graph in which the coiling speed is found by coiling the cord as 500 rpm.

It should be noted that, when the change of melt tension is measured with time, occasionally, peculiar amplitude values are detected, but such peculiar amplitude values may be neglected.

When measuring the melt tension of the polypropylene resin forming the foam layer, the melt tension be found by the same method as described above, using a sample that has been de-foamed by heating and melting a sample piece cut from the foam layer for about 15 minutes in a vacuum oven at 200° C.

The melt flow rate (MFR) of the polypropylene resin in this specification is measured using a test load of 21.18 N at a test temperature of 230° C. in accordance with JIS K 7210 (1976).

Preferably the cylindrical foam in the method of the present invention is a multilayer cylindrical foam having a resin layer on the outside and/or inside of a foam layer obtained by co-extrusion of foamable molten resin and non-foamable molten resin.

For example, as shown in FIG. 2(b), a multilayered cylindrical foam 2 wherein a resin layer 22 is provided on the outside surface of a foam layer 21 and, as shown in FIG. 2 (c) a multilayer cylindrical foam 2 wherein a resin layer 23 is provided on the inside surface of a foam layer 21, or, as shown in FIG. 2(d), a multilayered cylindrical foam 2 wherein a resin layer 22 is provided on the outside surface of a foam layer 21 and a resin layer 23 is provided on the inside surface of the foam layer 21 may be employed.

Forming a molded foam article using such a multilayer cylindrical foam 2 wherein a resin layer 22 and/or resin layer 23 is provided is a desirable mode in view of the fact that attributes such as dimensional accuracy and strength of the molded foam article obtained are improved and that the molded foam article obtained also has an excellent appearance. The beneficial effects are also exhibited that the extrusion stability is improved, that the resin layers 22, 23 prevent collapse of the cells of the foam layer 21 and that a molded foam article of low apparent density is obtained.

Also, there is no restriction to resin layers 22 or 23, and a multilayer can be included besides a single layer in the resin layers. There may be mentioned by way of example multilayer resin layers having a resin layer with gas barrier characteristics, such as a polyamide resin.

As the resin constituting the resin layer of the cylindrical foam, there is no particular restriction, but, usually, thermoplastic resins such as polyethylene resins, polypropylene resins or polystyrene resins may be employed on account of their excellent moldability and ease of procurement. Resins having good adhesion with the polypropylene resins constituting the base resin of the foam layer are preferred.

Where the resin constituting the resin layer is a polystyrene base resin, there may be mentioned by way of example as polystyrene resins homopolymers of styrene or styrene copolymers, the styrene-based monomer component contained in such copolymers being at least 25 wt %, preferably at least 50 wt % or more preferably at least 70 wt %. Specific examples that may be given of styrene copolymers include polystyrene, rubber modified polystyrene, styrene-acrylonitrile copolymer, styrene-butadiene-acrylonitrile copolymer, styrene-acrylate copolymer, styrene-methacrylate copolymer, styrene-methyl methacrylate copolymer, styrene-ethyl methacrylate copolymer, styrene-methyl acrylate copolymer, styrene-ethyl acrylate copolymer, styrene-malleic anhydride copolymer, polystyrene-polyphenylene ether copolymer and mixtures of polystyrene and polyphenylene ether.

In order to improve the adhesion of the foam layer with respect to the polystyrene resin constituting the resin layer, preferably one or two or more of a compatibility-promoting component, resilient component or polypropylene resin is added in an amount of not more than 30 wt %, and is preferably added in an amount of not more than 20 wt %. The lower limiting value is about 5 wt %.

As additives acting as the aforementioned compatibility-promoting component or resilient component, from the point of view of for example recycling and costs, there are preferably employed rubber modified polystyrene such as high-impact polystyrene, styrene conjugated diene block copolymers such as styrene-butadiene-styrene block copolymer or styrene-isoprene-styrene block copolymer, or for example the hydrogenated forms of the above styrene-based polymers.

As the polyethylene resin employed in the aforementioned resin layer, there may be mentioned by way of example resins a homopolymer of ethylene or a copolymer of ethylene and α-olefin of carbon number 3 to 12 having a ethylene content of at least 60 wt %; specifically, high-density polyethylene, medium density polyethylene, low-density polyethylene, straight-chain low-density polyethylene, ultra-low density polyethylene or ethylene-vinyl acetate copolymer are preferred.

In order to improve adhesion of the polyethylene resin with the foam layer, preferably no more than 30 wt % of polypropylene resin is added and more preferably no more than 20 wt % thereof is added. The lower limit is about 5 wt %.

As the polypropylene resin that is added to the polyethylene resin, there may be mentioned by way of example resins which are similar to the polypropylene resins constituting the foam layer.

As the polypropylene resins employed in the foam layer, there may be mentioned by way of example polypropylene resins for example propylene homopolymer or a copolymer of propylene and another copolymerizable monomer having a propylene content of at least 60 wt %; as copolymerization components, there may be mentioned by way of example ethylene, butylene or other α-olefins, the carbon number of these α-olefins being no more than 12 and preferably no more than 8. The polypropylene resins preferably constitute at least 60 wt % with respect to the entire weight constituting the resin layer, more preferably at least 70 wt % and most preferably 100 wt %.

However, the resin layer in the molded foam article according to the present invention is not restricted to these and thermoplastic resins such as for example polycarbonate resins, polyamide resins or polyester resins could be employed.

Various types of additives such as ultraviolet absorbing agents, infra-red absorbing agents, infra-red reflecting agents, flame retardant agents, fluidity improvers, weather-proofing agents, coloring agents, heat stabilizers, antioxidants, fillers or electrostatic charging preventing agents may be added to the base resin constituting the foam layer in the present invention, in accordance with requirements.

Molded foam articles derived from cylindrical foam 2 of construction in accordance with FIG. 2(d) according to the present invention have improved strength such as compression strength, bending strength and tensile strength and high surface hardness and are therefore preferably employed for example for ducts, tanks, containers or pallets.

The invention is described in more detail below with reference to examples. However, the present invention is not restricted to these examples.

EXAMPLE 1

Foamable molten resin was obtained by mixing 3.1 weight parts of foam adjustment agent "master batch" (base resin: 85 wt % of low-density polyethylene, 5 wt % of sodium stearate and 10 wt % of talc) with 100 weight parts of base resin obtained by mixing 65 wt % of polypropylene resin (a) PF814 (MT: 200 mN, MFR: 3 g/10 minutes) manufactured by Sun Allomer Company Ltd and 35 wt % of polypropylene resin (b) J-700 GP (MT: 4 mN, MFR: 9 g/10 minutes) manufactured by Idemitsu Petrochemical Co., Ltd, supplying to an extruder of internal diameter 65 mm and heating, melting and kneading, then introducing under pressure and kneading 0.34 mol of isobutane with respect to 1 kg of base resin (100 mol % of isobutane with respect to 100 mol % of foaming agent) as foaming agent from a point midway in the extruder.

Next, the temperature (hereinbelow simply referred to as the "melt temperature") of the foamable molten resin was adjusted to 167° C. and the resin was introduced into accumulators. Next, pressure was applied to the ram of each accumulator and foamable molten resin was extruded at an extrusion rate of 64 kg/hr·cm$^2$ from this die by opening a gate arranged at the leading end of a circular die, thereby forming a cylindrical foam. The cylindrical foams obtained had exceptionally excellent foam condition and appearance.

Next, a cylindrical foam obtained was arranged within a cylindrical-shaped mold positioned directly below the circular die and the mold was closed. Molding was then performed by blowing in pressurized gas (air) into the interior of the cylindrical foam from a gas introduction port arranged at the bottom of the mold while simultaneously, the pressure between the outer surface of the cylindrical foam and the inner surface of the mold was reduced; after molding and cooling, a duct-shaped molded foam article (hollow body of dimensions of opening mouth is 70 mm×150 mm and dimensions of length is 600 mm) was separated from the mold. Excellent appearance was obtained with no wrinkles caused by furrow-shaped corrugations generated in the cylindrical foam appearing in the surface of the foam obtained.

EXAMPLE 2

In Example 1, foamable molten resin was obtained by mixing 3.1 weight parts of foam adjustment agent "master batch" as in Example 1 with 100 weight parts of base resin obtained by mixing 30 wt % of polypropylene resin (a) PF814 and 70 wt % of polypropylene resin (b) J-700 GP, and introducing under pressure and kneading 0.34 mol of isobutane with respect to 1 kg of base resin (100 mol % of isobutane with respect to 100 mol % of foaming agent) as in Example 1 as foaming agent from a point midway in the extruder.

Next, a duct-shaped molded foam article was formed by arranging the cylindrical foam within a mold in the same way as in Example 1 and conducting molding with a melt temperature and extrusion rate in accordance with the conditions indicated in Table 1. Excellent appearance was obtained with no wrinkles caused by furrow-shaped corrugations generated in the cylindrical foam appearing in the surface of the foam obtained.

EXAMPLE 3

In Example 1, foamable molten resin was obtained by mixing 3.1 weight parts of foam adjustment agent "master batch" as in Example 1 with 100 weight parts of base resin obtained by mixing 65 wt % of polypropylene resin (a) PF814 and 35 wt % of polypropylene resin (b) J-700 GP, and introducing under pressure and kneading 0.34 mol of liquefied carbon dioxide with respect to 1 kg of base resin (100 mol % of carbon dioxide with respect to 100 mol % of foaming agent) as in Example 1 as foaming agent from a point midway in the extruder.

Next, a duct-shaped molded foam article was formed by arranging the cylindrical foam within a mold in the same way as in Example 1 and conducting molding with a melt temperature and extrusion rate in accordance with the conditions indicated in Table 1. Excellent appearance was obtained with no wrinkles caused by furrow-shaped corrugations generated in the cylindrical foam appearing in the surface of the foam obtained.

By employing a physical foaming agent consisting of carbon dioxide, the cooling time of the molded foam article was shortened to about ⅓ compared with Example 1.

EXAMPLE 4

In Example 1, foamable molten resin was obtained by mixing 3.1 weight parts of foam adjustment agent "master batch" as in Example 1 with 100 weight parts of base resin obtained by mixing 20 wt % of polypropylene resin (a) PF814 and 80 wt % of polypropylene resin (b) J-700 GP, and introducing under pressure and kneading 0.31 mol of isobutane with respect to 1 kg of base resin (100 mol % of isobutane with respect to 100 mol % of foaming agent) as in Example 1 as foaming agent from a point midway in the extruder.

Next, a duct-shaped molded foam article was formed by arranging the cylindrical foam within a mold in the same way as in Example 1 and conducting molding with a melt temperature and extrusion rate in accordance with the conditions indicated in Table 1. Excellent appearance was obtained with no wrinkles caused by furrow-shaped corrugations generated in the cylindrical foam appearing in the surface of the foam obtained.

EXAMPLE 5

Foamable molten resin was obtained in the same way as in the case of Example 3, except that 0.31 mol of liquefied carbon dioxide with respect to 1 kg of base resin (100 mol % of carbon dioxide with respect to 100 mol % of foaming agent) was introduced under pressure and kneaded, from a point midway in the extruder.

Non-foamable molten resin for use as an inside layer and outside layer was obtained by blending a coloring agent with reused resin (MT: 45 mN, MFR: 7 g/10 minutes) of molded foam articles obtained by Example 1, by respectively separately supplying this raw material to two extruders of internal diameter 40 mm and heating, melting and kneading.

Next, the temperature of the foamable molten resin was adjusted to 172° C. and the temperature of the non-foamable molten resin was adjusted to 185° C. and these were then introduced into separate accumulators connected with respective extruders. Next, a multilayer cylindrical foam was formed by co-extrusion at an extrusion rate of 80 kg/hr·cm$^2$ of this molten material from the die by opening a gate arranged at the leading end of a circular die and simultaneously applying pressure to the rams of the accumulators. A multilayer foam was thus formed comprising an inner layer/foam layer/outer layer as shown in FIG. 2(d) discharged from the die in layer form by merging of the molten material injected by the accumulators into the die in the vicinity of the gate provided in the vicinity of the leading end of the die. The inner layer and the outer layer were non-foamed resin layers.

The multilayer cylindrical foam obtained was of particularly attractive appearance, being of cylindrical shape with little vertical fluctuation of diameter in the length direction of the extruded cylindrical foam.

Next, a duct-shaped molded foam article was formed by performing blow molding in the same way as in the case of Example 1 using the multilayer cylindrical foam obtained. Excellent appearance was obtained with no wrinkles caused by furrow-shaped corrugations generated in the cylindrical foam appearing in the surface of the foam obtained. The thickness of both the outside resin layer and inside resin layer in the molded foam article was 1.0 mm each.

By employing a physical foaming agent consisting of carbon dioxide, the cooling time after foaming was shortened to about ⅓ compared with Example 1.

Also, when comparing the cooling times of Example 3 and Example 5, since the blending amount of polypropylene resin (b) in the case of Example 3 was more than in the case of Example 5, the cooling time was shorter than in the case of Example 5.

COMPARATIVE EXAMPLE 1

Foamable molten resin was obtained by mixing 3.1 weight parts of foam adjustment agent "master batch" in the same way as in the case of Example 1 with 100 weight parts of base resin obtained by mixing 85 wt % of polypropylene resin (a) PF814 (MT: 200 mN, MFR: 3 g/10 minutes) manufactured by Sun Allomer Ltd and 15 wt % of polypropylene resin (b) J-700 GP, supplying to an extruder of internal diameter 65 mm and heating, melting and kneading, then introducing under pressure and kneading 0.34 mol of isobutane with respect to 1 kg of base resin (100 mol % of isobutane with respect to 100 mol % of foaming agent) in the same way as in Example 1 from a point midway in the extruder.

A molded foam article was obtained in the same way as in Example 1 by molding a cylindrical foam by extrusion using a melt temperature the same as in Example 1 and an extrusion rate that was substantially the same. However, although the appearance and moldability of the molded foam article obtained were excellent, the product cost was high.

COMPARATIVE EXAMPLE 2

Foamable molten resin was obtained by mixing 3.1 weight parts of foam adjustment agent "master batch" in the same way as in the case of Example 1 with 100 weight parts of base resin obtained by mixing 15 wt % of polypropylene resin (a) PF814 manufactured by Sun Allomer Ltd and 85 wt % of polypropylene resin (b) J-700 GP, and introducing under pressure and kneading 0.34 mol of isobutane with respect to 1 kg of base resin (100 mol % of isobutane with respect to 100 mol % of foaming agent) from a point midway in the extruder.

A cylindrical foam was molded by extrusion using a melt temperature and an extrusion rate that were substantially the same as in as in Example 1. However, cell collapse of the cylindrical foam obtained was exceptionally severe, so that molding of a molded foam article of suitable appearance could not be achieved on account of the poor condition of the foam.

Table 1 shows, for the Examples 1 to 5 and Comparative Examples 1 and 2, the MT and MFR of the raw material used, the shape of the molded foam article (indicated in the table by "shape"), the type of foaming agent, the kind of foaming agent, the melt temperature and the extrusion rate per unit area (shown in the table as "extrusion rate") and also, as the physical properties of the molded foam article obtained, the apparent density of the foam layer (shown in the table as "density of the foam layer"), the average thickness (shown in the table as "thickness"), average cell diameter, ratio of the closed cells, melt tension and appearance.

In the table, "i-B" is an abbreviation for isobutane and "$CO_2$" is an abbreviation for carbon dioxide.

As can be seen from Table 1, in the case of the molded foam articles obtained in the Examples, thick molded foam articles were obtained with an average thickness of at least 4.0 mm.

100 mol % of foaming agent) as foaming agent from a point midway in an extruder as in Example 1.

A duct-shaped molded foam article was then obtained by arranging the cylindrical foam obtained in a mold in the same way as in Example 1 and conducting extrusion with the melt temperature and extrusion rate conditions shown in Table 2. Excellent appearance was obtained with no wrinkles caused by furrow-shaped corrugations generated in the cylindrical foam appearing in the surface of the foam obtained.

EXAMPLE 7

Foamable molten resin was produced in the same way as in the case of Example 6 apart from the use of the raw material blend shown in Table 2. A duct-shaped molded foam article was then formed by arranging the cylindrical foam obtained in a mold in the same way as in Example 1 and conducting extrusion with the melt temperature and extrusion rate conditions shown in Table 2. Excellent appearance was obtained with no wrinkles caused by furrow-shaped corrugations generated in the cylindrical foam appearing in the surface of the foam obtained.

EXAMPLE 8

Foamable molten resin was produced in the same way as in the case of Example 6 apart from the use of the raw material blend shown in Table 2. A duct-shaped molded

TABLE 1

| | Raw Material and Blending Amount (wt %) | Shape | | Foaming Agent (mol/kg) | Melt Temperature (° C.) | Extrusion Rate (kg/hr · cm$^2$) | Density of the Foam Layer (g/cm$^3$) | Thickness (mm) | Average Cell Diameter (mm) | Ratio of the Closed Cells (%) | Melt Tension (mN) | Appearance |
|---|---|---|---|---|---|---|---|---|---|---|---|---|
| Example 1 | (a)/(b) = 65/35 | Duct | Single Layer | i-B (0.34) | 167 | 64 | 0.16 | 5.0 | 1.0 | 56 | 48 | 0 |
| Example 2 | (a)/(b) = 30/70 | | | i-B (0.34) | 172 | 72 | 0.18 | 5.0 | 0.9 | 32 | 32 | 0 |
| Example 3 | (a)/(b) = 65/35 | | | $CO_2$ (0.34) | 166 | 70 | 0.15 | 5.0 | 0.5 | 65 | 46 | 0 |
| Example 4 | (a)/(b) = 20/80 | | | i-B (0.31) | 172 | 75 | 0.22 | 5.0 | 0.9 | 18 | 30 | 0 |
| Example 5 | (a)/(b) = 20/80 | | Multi-layer | $CO_2$ (0.31) | 172 | 80 | 0.20 | 4.0 | 0.4 | 36 | 29 | 0 |
| Comparative Example 1 | (a)/(b) = 85/15 | Duct | Single Layer | i-B (0.34) | 167 | 62 | 0.16 | 5.0 | 1.0 | 68 | 60 | 0 |
| Comparative Example 2 | (a)/(b) = 15/85 | | | i-B (0.34) | 168 | 78 | — | — | — | — | — | — |

(a) Resin; PF814 (MT = 200 mN, MFR = 3 g/10 min)
(b) Resin; J-700GP (MT = 4 mN, MFR = 9 g/10 min)

EXAMPLE 6

Foamable molten resin was obtained by mixing 3.1 weight parts of foam adjustment agent "master batch" in the same way as in Example 1 with 100 weight parts of base resin obtained by mixing 70 wt % of reused resin (c) (MT: 45 mN, MFR: 7 g/10 minutes) of molded foam articles obtained in Example 1 as polypropylene resins with 30 wt % of polypropylene resin (b) J-700 GP, and introducing under pressure and kneading 0.31 mol of isobutane with respect to 1 kg of base resin (100 mol % of isobutane with respect to foam article was then formed by arranging the cylindrical foam obtained in a mold in the same way as in Example 1 and conducting extrusion with the melt temperature and extrusion rate conditions shown in Table 2. Excellent appearance was obtained with no wrinkles caused by furrow-shaped corrugations generated in the cylindrical foam appearing in the surface of the foam obtained.

In addition, polypropylene resin (b-2) K1014 (melt tension 14 mN, melt flow rate 4.7 g/10 minutes) manufactured by Chisso corporation in Table 2.

COMPARATIVE EXAMPLE 3

Foamable molten resin was produced in the same way as in the case of Example 6 apart from the use of the raw material blend shown in Table 2. Extrusion was then conducted with the melt temperature and extrusion rate conditions shown in Table 2. However, cell collapse of the foam layer of the cylindrical foam obtained as a result was exceptionally severe, so that molding of a molded foam article of suitable appearance could not be achieved on account of the poor condition of the foam.

Table 2 shows, for the Examples 6 to 8 and Comparative Example 3, the MT and MFR of the raw material used, the shape of the molded foam article (indicated in the table by "shape"), the type of foaming agent, the kind of foaming agent, the melt temperature and the extrusion rate per unit area (shown in the table as "extrusion rate") and also, as the physical properties of the molded foam article obtained, the apparent density of the foam layer (shown in the table as "density of the foam layer"), the average thickness (shown in the table as "thickness"), average cell diameter, ratio of the closed cells, melt tension and appearance.

In the table, "i-B" is an abbreviation for isobutane and "$CO_2$" is an abbreviation for carbon dioxide.

In the case of the molded foam articles obtained in the Examples, thick molded foam articles were obtained with an average thickness of at least 5.0 mm.

gate arranged at the leading end of a circular die, thereby forming a cylindrical foam. The cylindrical foam obtained had exceptionally excellent foam condition and appearance.

Next, a cylindrical foam obtained was arranged within a cylindrical-shaped metal mold in the same way as in Example 1 to form a duct-shaped molded foam article. Excellent appearance was obtained with no wrinkles caused by furrow-shaped corrugations generated in the cylindrical foam appearing in the surface of the foam obtained.

EXAMPLE 10

Foamable molten resin was produced in the same way as in the case of Example 9 apart from the use of the raw material blend shown in Table 3. Extrusion was then conducted with the melt temperature and extrusion rate conditions shown in Table 3. Excellent appearance was obtained with no wrinkles caused by furrow-shaped corrugations generated in the cylindrical foam appearing in the surface of the foam obtained.

EXAMPLE 11

Foamable molten resin was produced in the same way as in the case of Example 9 by introducing under pressure and kneading from a point midway in an extruder, apart from the use of the raw material blend shown in Table 3. Extrusion

TABLE 2

| | Raw Material and Blending Amount (wt %) | Shape | Foaming Agent (mol/kg) | Melt Temperature (° C.) | Extrusion Rate (kg/hr · cm$^2$) | Properties of Molded Foam Article |||||| 
|---|---|---|---|---|---|---|---|---|---|---|---|
| | | | | | | Density of the Foam Layer (g/cm$^3$) | Thickness (mm) | Average Cell Diameter (mm) | Ratio of the Closed Cells (%) | Melt Tension (mN) | Appearance |
| Example 6 | (c)/(b-1) = 70/30 | Duct | Single Layer | i-B (0.31) | 167 | 70 | 0.20 | 5.0 | 0.9 | 61 | 30 | 0 |
| Example 7 | (c)/(b-1) = 30/70 | | | i-B (0.31) | 168 | 72 | 0.24 | 5.0 | 1.0 | 30 | 17 | 0 |
| Example 8 | (c)/(b-2) = 30/70 | | | i-B (0.31) | 172 | 72 | 0.23 | 5.0 | 0.9 | 5 | 26 | 0 |
| Comparative Example 3 | (c)/(b-1) = 20/80 | Duct | Single Layer | i-B (0.31) | 174 | 76 | — | — | — | — | — | — |

(c) Resin; Recovered Raw Material in Practical Example 1 (MT = 45 mN, MFR = 7 g/10 min)
(b-1) Resin; J-700 GP (MT = 4 mN, MFR = 9 g/10 min)
(b-2) Resin; K1014 (MT = 14 mN, MFR = 4.7 g/10 min)

EXAMPLE 9

Foamable molten resin was obtained by mixing 3.1 weight parts of foam adjustment agent "master batch" in the same way as in Example 1 with 100 weight parts of base resin obtained by mixing 30 wt % of polypropylene resin (a) PF814, 30 wt % of polypropylene resin (b) J-700 GP and 40 weight parts of reused resin (MT: 45 mN, MFR: 7 g/10 minutes) of molded foam articles obtained in Example 1 as polypropylene resin (c), and likewise introducing under pressure and kneading 0.31 mol of isobutane with respect to 1 kg of base resin (100 mol % of isobutane with respect to 100 mol % of foaming agent) as foaming agent from a point midway in the extruder in the same way as in Example 1.

Next, the temperature of the foamable molten resin was adjusted to 171° C. and the resin was introduced into accumulators. Next, pressure was applied to the ram of each accumulator and foamable molten resin was extruded at an extrusion rate of 75 kg/hr·cm$^2$ from this die by opening a was then conducted with the melt temperature and extrusion rate conditions shown in Table 3. Excellent appearance was obtained with no wrinkles caused by furrow-shaped corrugations generated in the cylindrical foam appearing in the surface of the foam obtained.

COMPARATIVE EXAMPLE 4

Foamable molten resin was produced in the same way as in the case of Example 9 by introducing under pressure and kneading from a point midway in an extruder, apart from the use of the raw material blend shown in Table 3. Extrusion was then conducted with the melt temperature and extrusion rate conditions shown in Table 3.

However, cell collapse of the foam layer of the cylindrical foam obtained as a result was exceptionally severe, so that molding of a molded article of suitable appearance could not be achieved on account of the poor condition of the foam.

COMPARATIVE EXAMPLE 5

Foamable molten resin was produced in the same way as in the case of Example 9 by introducing under pressure and kneading from a point midway in an extruder, apart from the use of the raw material blend shown in Table 3. Extrusion was then conducted with the melt temperature and extrusion rate conditions shown in Table 3.

However, although the appearance and moldability of the molded foam article obtained as a result were excellent, the product cost was high.

Table 3 shows, for the Examples 9 to 11 and Comparative Examples 4 and 5, the MT and MFR of the raw material used, the shape of the molded foam article (indicated in the table by "shape"), the type of foaming agent, the kind of foaming agent, the melt temperature and the extrusion rate per unit area (shown in the table as "extrusion rate") and also, as the physical properties of the molded foam article obtained, the apparent density of the foam layer (shown in the table as "density of the foam layer"), the average thickness (shown in the table as "thickness"), average cell diameter, ratio of the closed cells, melt tension and appearance. In the table, "i-B" is an abbreviation for isobutane and "$CO_2$" is an abbreviation for carbon dioxide. In the case of the molded foam articles obtained in the Examples, thick molded foam articles were obtained with an average thickness of at least 5.0 mm.

$V_a$ is the apparent volume ($cm^3$) found from the dimensions of the external shape of the test piece;

$\rho_f$ is the apparent density of the test piece ($g/cm^3$); and $\rho_s$ is the density of the base resin of the test piece ($g/cm^3$)

It should be noted that, of the physical properties in Tables 1 to 3, the apparent density of the foam layer is measured as follows and the average thickness and average cell diameter are measured by the method described above.

(Apparent Density of the Foam Layer)

Using a test piece cut from a foam layer of the molded foam article obtained, the test piece weight (g) is found by dividing by the volume ($cm^3$) found from the external dimensions of this test piece.

Evaluation of the appearance shown in Tables 1 to 3 is conducted as indicated below.

(Evaluation of the Appearance)

Evaluation of the appearance is conducted in accordance with the following criteria in regard to the molded foam article obtained.

O . . . the shape of the cells is uniform, with little fluctuation of thickness and no local formation of recesses (sinks).

X . . . there is local formation of giant cells, with considerable fluctuation thickness and local formation of recesses (sinks).

TABLE 3

| | Raw Material and Blending Amount (wt %) | Shape | Foaming Agent (mol/kg) | Melt Temperature (° C.) | Extrusion Rate (kg/hr · cm²) | Density of the Foam Layer (g/cm³) | Thickness (mm) | Average Cell Diameter (mm) | Ratio of the Closed Cells (%) | Melt Tension (mN) | Appearance |
|---|---|---|---|---|---|---|---|---|---|---|---|
| Example 9 | (a)(b)(c) = 30/30/40 | Duct Single Layer | i-B (0.31) | 171 | 75 | 0.20 | 5.0 | 0.8 | 80 | 42 | O |
| Example 10 | (a)(b)(c) = 15/75/10 | | i-B (0.31) | 172 | 78 | 0.21 | 5.0 | 0.9 | 50 | 29 | O |
| Example 11 | (a)(b)(c) = 10/30/60 | | i-B (0.31) | 171 | 76 | 0.20 | 5.0 | 0.9 | 70 | 37 | O |
| Comparative Example 4 | (a)(b)(c) = 5/90/5 | Duct Single Layer | i-B (0.31) | 174 | 80 | — | — | — | — | — | — |
| Comparative Example 5 | (a)(b)(c) = 70/10/20 | | i-B (0.31) | 170 | 72 | 0.19 | 5.0 | 0.9 | 55 | 55 | O |

(a) Resin; PF814 (MT = 200 mN, MFR = 3 g/10 min)
(b) Resin; J-700GP (MT = 4 mN, MFR = 9 g/10 min)
(c) Resin; Recovered Raw Material in Practical Example 1 (MT = 45 mN, MFR = 7 g/10 min)

The closed cell ratio was determined by the following method in the case of both the Examples and the Comparative Examples.

(Measurement of the Closed Cell Ratio of a Foam Layer)

Using a test piece from the foam layer of the molded foam article obtained, Vx is found by the procedure C of ASTM D 2856-70 (re-authorized in 1976) by using Air Comparison Pycnometer 930 manufactured by Toshiba Beckman Co., Ltd. and calculated by the following expression. Portions where the cells are crushed are excluded.

The closed cell ratio $(\%) = (V_x - V_a\,(\rho_f/\rho_s)) \times 100 / (V_a - V_a\,(\rho_f/\rho_s))$ where $V_x$ is the actual volume of the test piece (sum of the volume of the closed cells portion and volume of the resin portion) ($cm^3$);

What is claimed is:

1. A process for the production of a polypropylene resin hollow molded foam article, in which a cylindrical foam having a foam layer is formed by extruding from a die a foamable molten resin comprising a base resin containing a foaming agent, and then placing said cylindrical foam in a metal mold while in a softened state, wherein the base resin is one selected from among the following (i), (ii), (iii), and (iv):

(i) a resin composed of at least 20 wt % and less than 70 wt % (a) polypropylene resin with a melt tension of at least 98 mN at 230° C. and a melt flow rate of 0.5 to 15 g/10 minutes at 230° C. and over 30 wt % and no more than 80 wt % (b) polypropylene resin with a melt tension of less than 30 mN (excluding 0) at 230° C. and a melt flow rate of 2 to 30 g/10 minutes at 230° C. (the combined amount of (a) and (b) being 100 wt %);

(ii) a resin composed of 30 to 70 wt % (c) polypropylene resin with a melt tension of at least 30 mN and less than 98 mN at 230° C. and a melt flow rate of 2 to 15 g/10 minutes at 230° C. and 30 to 70 wt % (b) polypropylene resin with a melt tension of less than 30 mN (excluding 0) at 230° C. and a melt flow rate of 2 to 30 g/10 minutes at 230° C. (the combined amount of (c) and (b) being 100 wt %);

(iii) a resin composed of at least 20 wt % and less than 70 wt % (a) polypropylene resin with a melt tension of at least 98 mN at 230° C. and a melt flow rate of 0.5 to 15 g/10 minutes at 230° C. and over 30 wt % and no more than 80 wt % (c) polypropylene resin with a melt tension of at least 30 mN at 230° C. and less than 98 mN and a melt flow rate of 2 to 15 g/10 minutes (the combined amount of (a) and (c) being 100 wt %) at 230° C.;

(iv) a resin composed of (a) a polypropylene resin with a melt tension of at least 98 mN at 230° C. and a melt flow rate of 0.5 to 15 g/10 minutes at 230° C., (b) a polypropylene resin with a melt tension of less than 30 mN (excluding 0) at 230° C. and a melt flow rate of 2 to 30 g/10 minutes at 230° C., and (c) a polypropylene resin with a melt tension of at least 30 mN and less than 98 mN at 230° C. and a melt flow rate of 2 to 15 g/10 minutes at 230° C., with (a) accounting for 5 to 65 wt %, (b) for 30 to 78 wt %, and (c) for 5 to 65 wt % (with the combined amount of (a), (b), and (c) being 100 wt %), and said resin having a composition within the bounds of a quadrangle ABCD (including on the lines of the quadrangle) drawn by connecting with straight lines the: four points A (17, 78, 5), B (5, 72, 23), C (5, 30, 65), and D (65, 30, 5) which are component coordinates (x, y, z) where the polypropylene resin (a) component is given as x wt %, the polypropylene resin (b) component is given as y wt %, and the polypropylene resin (c) component is given as z wt % in a triangular component graph in which the upper vertex of a regular triangle is marked as 100 wt % polypropylene resin (a), the lower left vertex as 100 wt % polypropylene resin (b), and the lower right vertex as 100 wt % polypropylene resin (c).

2. The process for the production of a polypropylene resin hollow molded foam article according to claim 1, wherein the cylindrical foam is a multilayer cylindrical foam having a resin layer on the outside and/or inside of the foam layer, obtained by co-extruding a foamable molten resin containing a foaming agent, and a non-foamable molten resin containing no foaming agent.

3. The process for the production of a polypropylene resin hollow molded foam, article according to claim 1, wherein the hollow molded foam is obtained by blowing a gas into the interior of a cylindrical foam placed in a metal mold.

4. The process for the production of a polypropylene resin hollow molded foam article according to claim 1, wherein the foaming agent is a physical foaming agent containing carbon dioxide.

5. The process for the production of a polypropylene resin hollow molded foam, article according to claim 2, wherein the hollow molded foam is obtained by blowing a gas into the interior of a cylindrical foam placed in a metal mold.

6. The process for the production of a polypropylene resin hollow molded foam article according to claim 2, wherein the foaming agent is a physical foaming agent containing carbon dioxide.

7. The process for the production of a polypropylene resin hollow molded foam article according to claim 3, wherein the foaming agent is a physical foaming agent containing carbon dioxide.

8. The process for the production of a polypropylene resin hollow molded foam article according to claim 5, wherein the foaming agent is a physical foaming agent containing carbon dioxide.

* * * * *